United States Patent
Meghpara et al.

(10) Patent No.: US 11,251,575 B2
(45) Date of Patent: Feb. 15, 2022

(54) CONNECTOR ALIGNMENT AND RETENTION PANEL FOR MODULAR BASED SYSTEM

(71) Applicant: Rockwell Automation Technologies, Inc., Mayfield Heights, OH (US)

(72) Inventors: Brijeshkumar Meghpara, Germantown, WI (US); Ilya Gurevich, Milwaukee, WI (US); Paul Grosskreuz, West Bend, WI (US); Juan Fernandez, Brown Deer, WI (US); Eric Gardner, Milwaukee, WI (US); David Figie, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/925,322

(22) Filed: Jul. 9, 2020

(65) Prior Publication Data
US 2022/0013964 A1    Jan. 13, 2022

(51) Int. Cl.
*H01R 13/74* (2006.01)
*H01R 12/70* (2011.01)
(Continued)

(52) U.S. Cl.
CPC ........... *H01R 13/741* (2013.01); *B65G 54/02* (2013.01); *H01R 12/7023* (2013.01); *H02K 41/02* (2013.01); *H01R 12/707* (2013.01)

(58) Field of Classification Search
CPC ..................................................... H02K 41/02
See application file for complete search history.

(56) References Cited

U.S. PATENT DOCUMENTS

| | | |
|---|---|---|
| 4,072,387 A | 2/1978 | Sochor |
| 4,813,885 A | 3/1989 | Colleran et al. |
| (Continued) | | |

FOREIGN PATENT DOCUMENTS

KR    10-1100446    12/2011

OTHER PUBLICATIONS

Publication titled "*iTRAK® The Intelligent Track System, Increase machine flexibility and throughput to enhance overall productivity*", Rockwell Automation, Publication No. MOTION-BR007A-EN-P, Jul. 2015.

*Primary Examiner* — Ross N Gushi
(74) *Attorney, Agent, or Firm* — Fay Sharpe LLP

(57) ABSTRACT

An electronics housing assembly includes a first housing portion and a second housing portion removably connected to the first housing portion to define an interior space that contains electronics components. A first group of the electronics components is connected to the first housing portion and a second group of the electronics components is connected to the second housing portion. A connector alignment and retention panel is connected to the first housing portion. The connector alignment and retention panel includes a connector support platform with a first connector mounting location. A first electrical connector that is part of the first group of the electronics components is operatively engaged with the first connector mounting location of the panel such that the first electrical connector is mounted on the panel and located in a select position relative to the first housing portion. A first corresponding electrical connector that is part of the second group of said electronics components is operatively secured to the second housing portion and is operatively engaged with the first electrical connector mounted on the panel.

15 Claims, 11 Drawing Sheets

(51) Int. Cl.
*H02K 41/02* (2006.01)
*B65G 54/02* (2006.01)

(56) References Cited

U.S. PATENT DOCUMENTS

| | | |
|---|---|---|
| 5,138,679 A | 8/1992 | Edwards et al. |
| 5,187,645 A | 2/1993 | Spalding et al. |
| 5,461,546 A | 10/1995 | Kobayashi et al. |
| 5,810,624 A | 9/1998 | Lamb |
| 5,961,339 A | 10/1999 | Koopman et al. |
| 6,095,856 A | 8/2000 | Horan et al. |
| 6,407,914 B1 | 6/2002 | Helot |
| 6,866,552 B2 | 3/2005 | Koehler |
| 7,722,364 B2 | 5/2010 | Klinger et al. |
| 7,931,494 B2 | 4/2011 | Long |
| 7,942,590 B2 | 5/2011 | Lu et al. |
| 8,853,998 B2 | 10/2014 | Aldana et al. |
| 9,219,340 B2 | 12/2015 | McSweyn et al. |
| 9,257,788 B1 | 2/2016 | Jia |
| 9,407,038 B2 * | 8/2016 | Jozwiak ........... H01R 13/62977 |
| 9,627,785 B1 * | 4/2017 | Melchor Saucedo ........................ H01R 13/506 |
| 10,040,412 B2 * | 8/2018 | Leverett, Jr. ........... H01H 85/15 |
| 2009/0130902 A1 | 5/2009 | Hall et al. |
| 2011/0261544 A1 | 10/2011 | Kelly |
| 2014/0294354 A1 | 10/2014 | Hung |

* cited by examiner

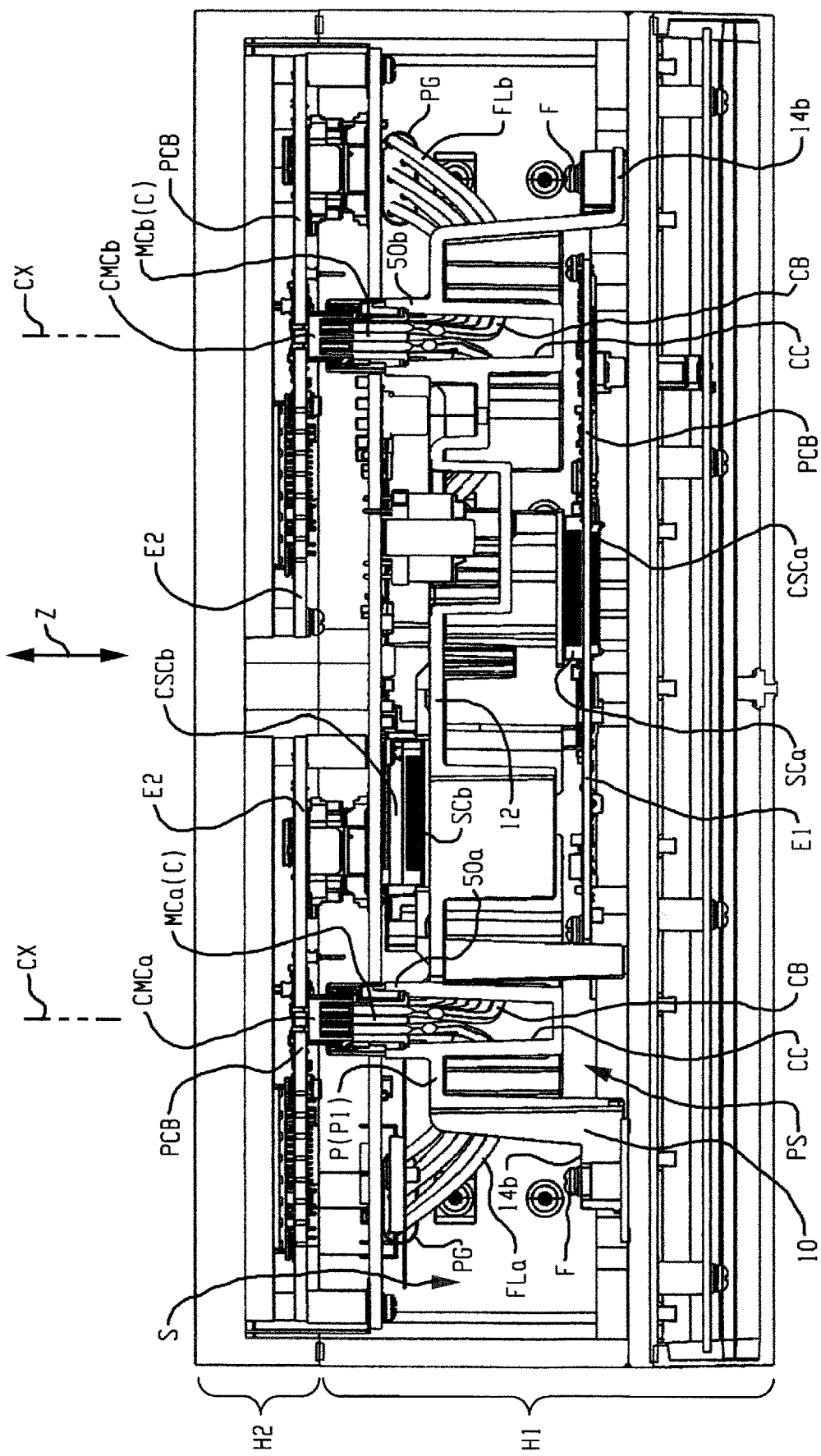

CONNECTOR ALIGNMENT AND RETENTION PANEL FOR MODULAR BASED SYSTEM

FIELD

The subject matter disclosed herein relates to a connector alignment and retention panel for an electronics housing. The connector alignment and retention panel can be used as part of a modular based system such as a modular, scalable linear motor system or any other system including one or more electronics housings assembled from at least two interconnected sections.

BACKGROUND INFORMATION

Historically, in power conversion products and other complex electrical systems, multiple internal pluggable connections are required during assembly as the different printed circuit board (PCB) subassemblies are brought together and enclosed within a housing having first or upper and second or lower portions that are interconnected. Typically, these internal pluggable connections are accomplished using "flying lead" type connector structures in which a mating connector is located at the end of plurality of wires that are loosely connected to a first (or lower) housing portion or a second (or upper) housing portion. During assembly, enough slack is present in the flying lead connectors to allow the plug connection to be completed before the first and second housing portions (or other housing portions) are connected together to complete construction of the housing in which the PCB subassemblies and other electrical component are contained.

These internal pluggable connections are difficult to implement in a compact product design in which space is limited because the flying leads, themselves, take up excessive space and the plug connections are difficult to complete or "make" when there is not enough room for an assembler to work. Also, each internal plug connection must be made separately. Furthermore, the required added length of the wires/cables of the flying lead connectors increase the amount of electromagnetic interference (EMI) generated which can cause interference with nearby electronic components, and the unrestrained, lengthy wires/cables can exhibit wear or "fretting" over time due to repeated movements from vibrations and the like. The foregoing issues and others can lead to failures resulting from incomplete connections and/or connections that are completely missed during the assembly process. Even if such failures are caught during quality control testing, costly and time-consuming reassembly must be carried out to correct the problem(s). Also, unrestrained flying lead connectors can lead to reliability problems due to EMI and also due to wire/cable fretting over time due to vibrations and other incidental movement of the connectors during use of the system.

BRIEF DESCRIPTION

In accordance with a first aspect of the present development, an electronics housing assembly includes a first housing portion and a second housing portion removably connected to the first housing portion to define an interior space that contains electronics components. A first group of said electronics components is connected to the first housing portion and a second group of said electronics components is connected to the second housing portion. A connector alignment and retention panel is connected to the first housing portion. The connector alignment and retention panel includes a connector support platform with a first connector mounting location. A first electrical connector that is part of said first group of said electronics components is operatively engaged with the first connector mounting location of said panel such that said first electrical connector is mounted on said panel and located in a select position relative to said first housing portion. A first corresponding electrical connector that is part of said second group of said electronics components is operatively secured to the second housing portion and is operatively engaged with the first electrical connector mounted on the panel.

In accordance with another aspect of the present disclosure, a connector alignment and retention panel for an electronics housing assembly includes a one-piece polymeric body including a connector support platform and a plurality of legs that extend outwardly relative to the connector support platform. Each of the legs comprising a foot located at an outer end spaced from said platform such that the platform is offset from each foot. Each foot defines a mounting opening for receiving a fastener. At least one electrical connector mounting location is located on said connector support platform of the body.

DETAILED DESCRIPTION

Figure 1A:
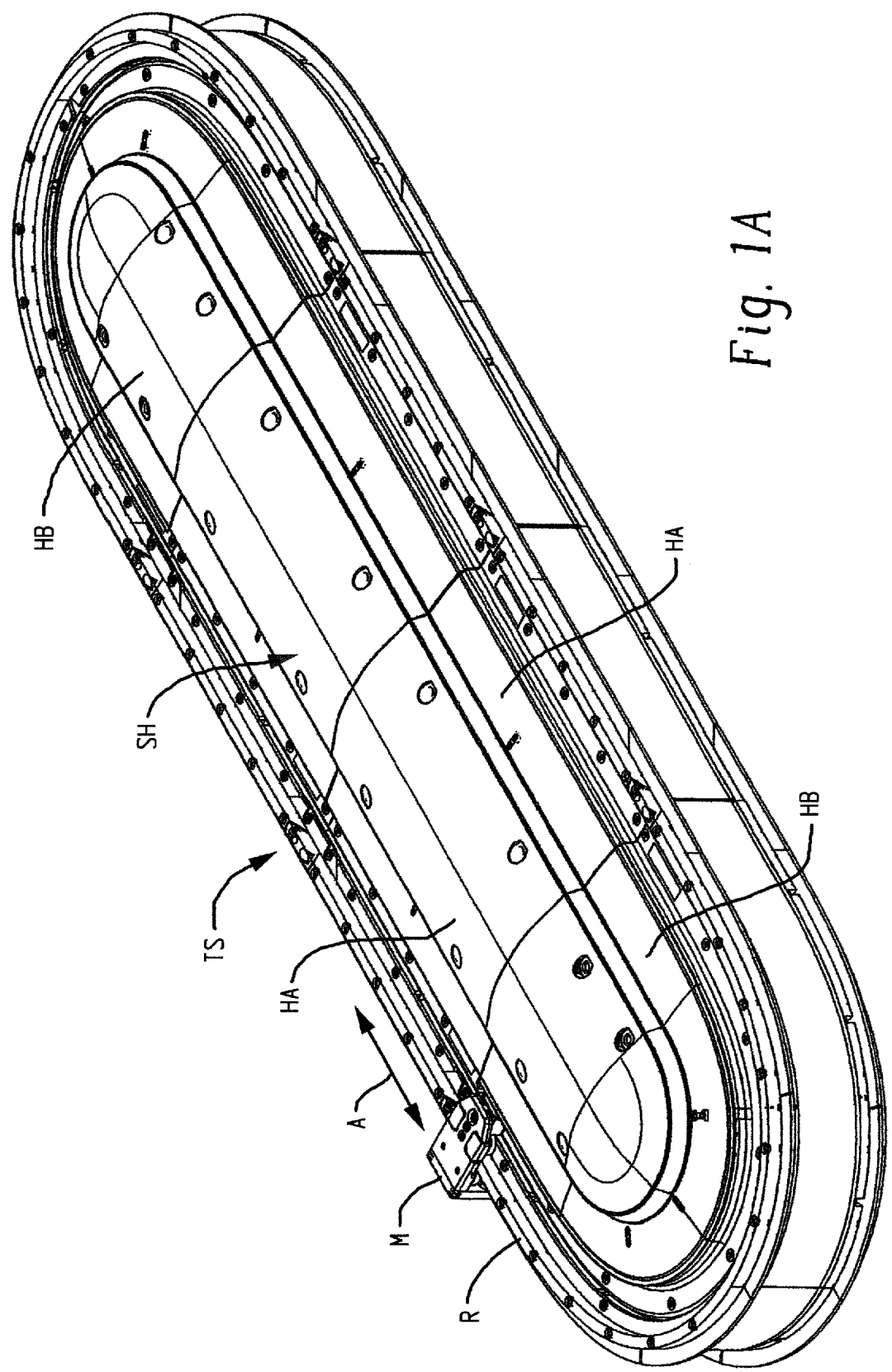
FIG. 1A is an isometric view of a modular, scalable linear motor track system which is one example of a system in which a connector alignment and retention panel according to the present development can be used.

FIG. 1A is an isometric view of a modular, scalable linear motor track system TS which is one example of a system in which a connector alignment and retention panel according to the present development can be used as described below. One example of such a linear motor track system TS is available commercially from Rockwell Automation under the registered trademark ITRAK®. The linear motor track system TS is a modular, scalable and linear motor system including a system housing SH in which electronic components are enclosed. The system housing SH comprises a plurality of modular housing assemblies including one or more straight housing assemblies HA and one or more curved housing assemblies HB that are interconnected to construct and define the system housing SH. The system housing SH comprises a rail R and the linear motor track system TS comprises at least one and typically multiple movers M (only one shown) that are operably movably engaged with the rail R. The one or more movers move bi-directionally along the rail R as indicated by the arrow A in a feedback-controlled manner as controlled by the motor electronics in the system housing SH. When multiple movers M are operably installed, they can be synchronized to move in unison with respect to each other or they can be independently controlled and move independently with respect to each other, depending on programming.

Figure 1B:
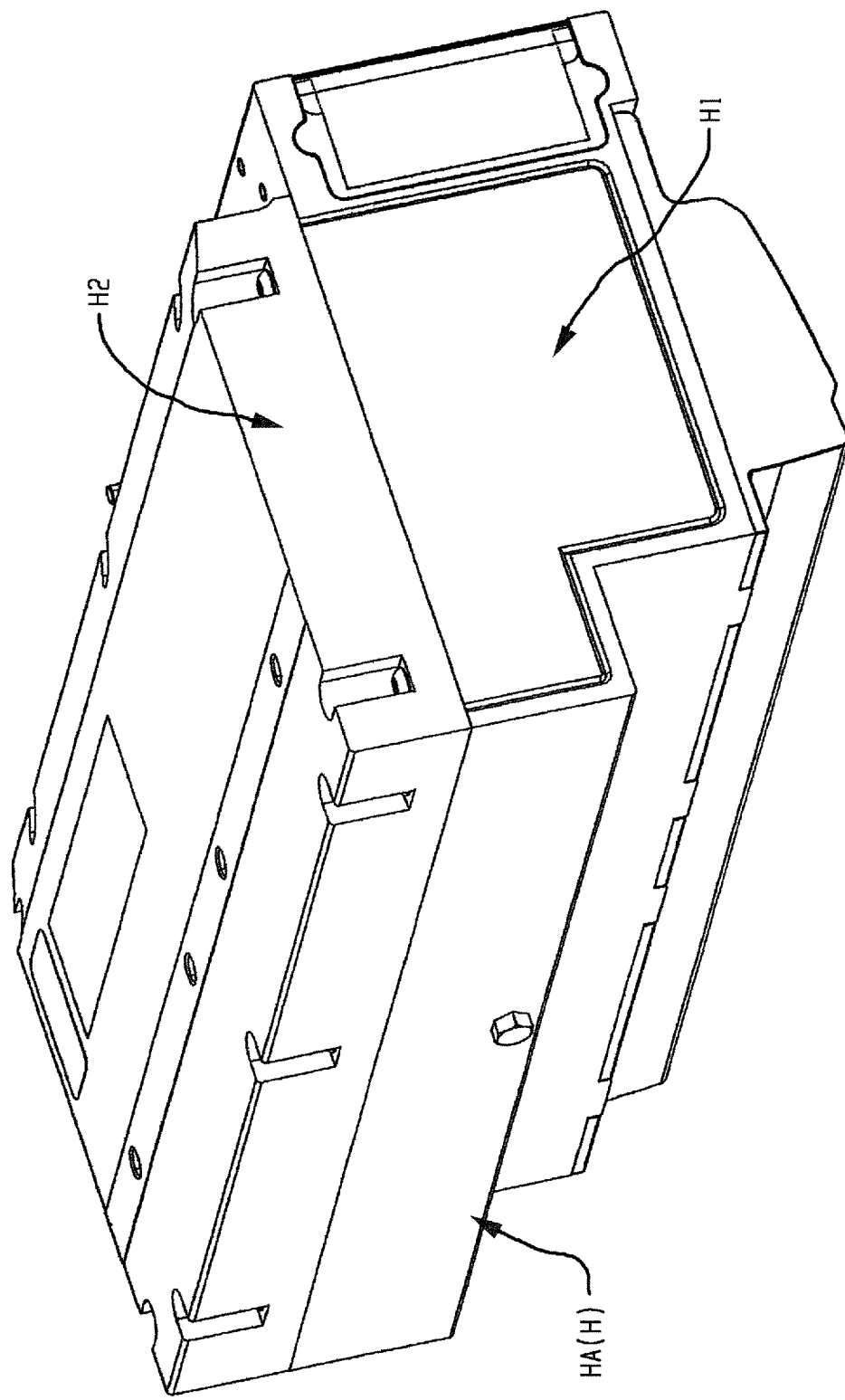
FIGS. 1B and 1C are respective isometric views of first and second electronics housing assemblies of the system of FIG. 1A that can be used individually or connected together to define a system housing, with FIG. 1B showing a straight housing assembly and FIG. 1C showing a curved housing assembly.
Figure 1C:
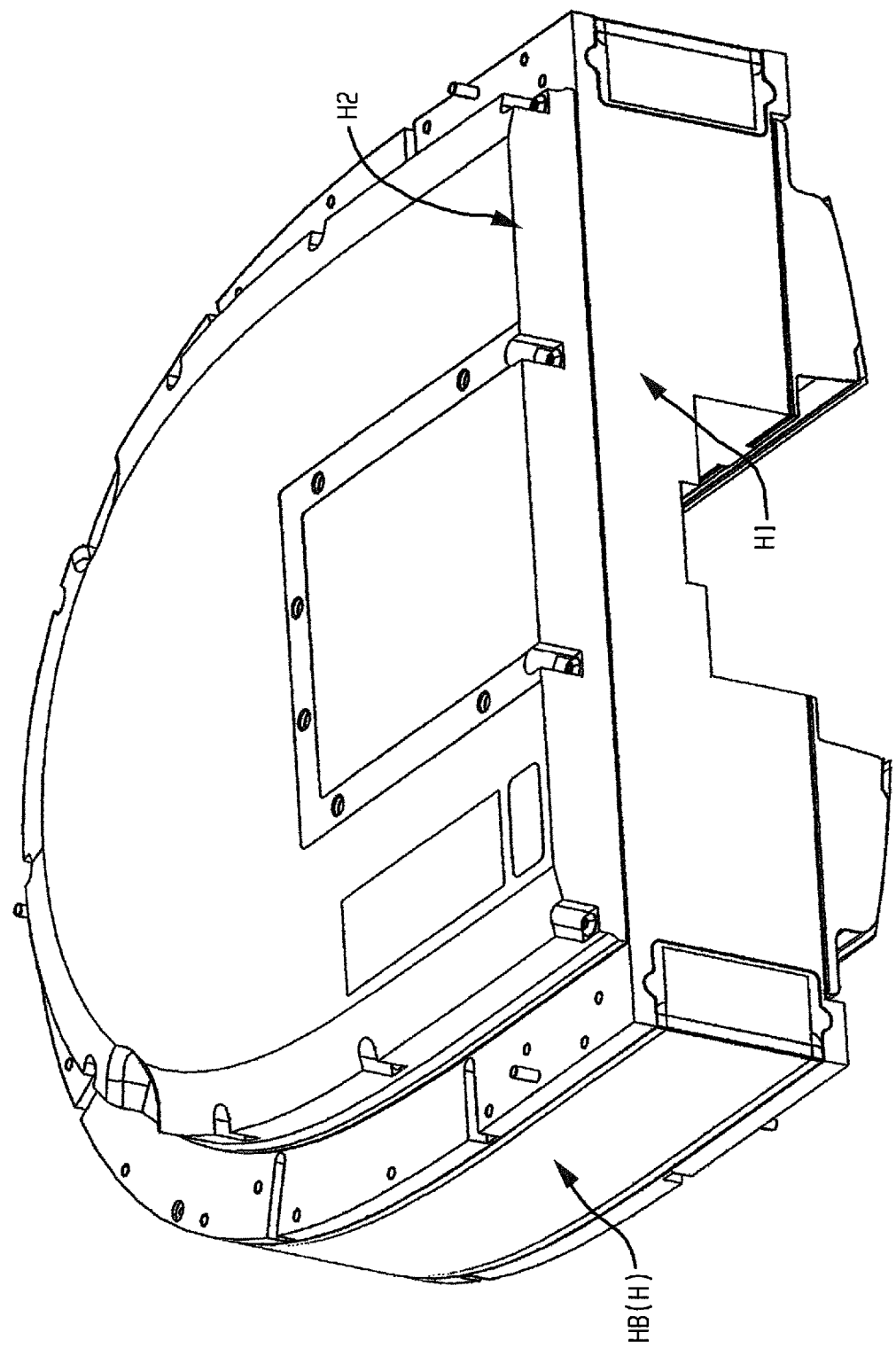

FIGS. 1B and 1C are respective isometric views of the straight (first) and curved (second) electronics housing assemblies HA,HB (generally housing assemblies H) shown in FIG. 1A that can be used individually or that can be connected together with one or more other housing assemblies as described above to define a housing enclosure such as the system housing SH.

In either case HA,HB, the housing assembly H comprises at least two sections or portions including a first (lower) housing or housing portion H1 and a second (upper) housing or housing portion H2 that are interconnected by fasteners (screws, pins, clips, rivets, etc.), mating projections, adhesive, welding/bonding, and/or other suitable devices, structures and/or means. When operably interconnected as shown in FIGS. 1A and 1B to define a housing assembly HA,HB, the first (lower) and second (upper) housing portions H1,H2 define and at least partially enclose an internal space S (FIGS. 2A & 2B) that contains electronic components such as electronic devices, motors, fans, printed circuit boards (PCBs), switches, and the like.

Figure 2A:
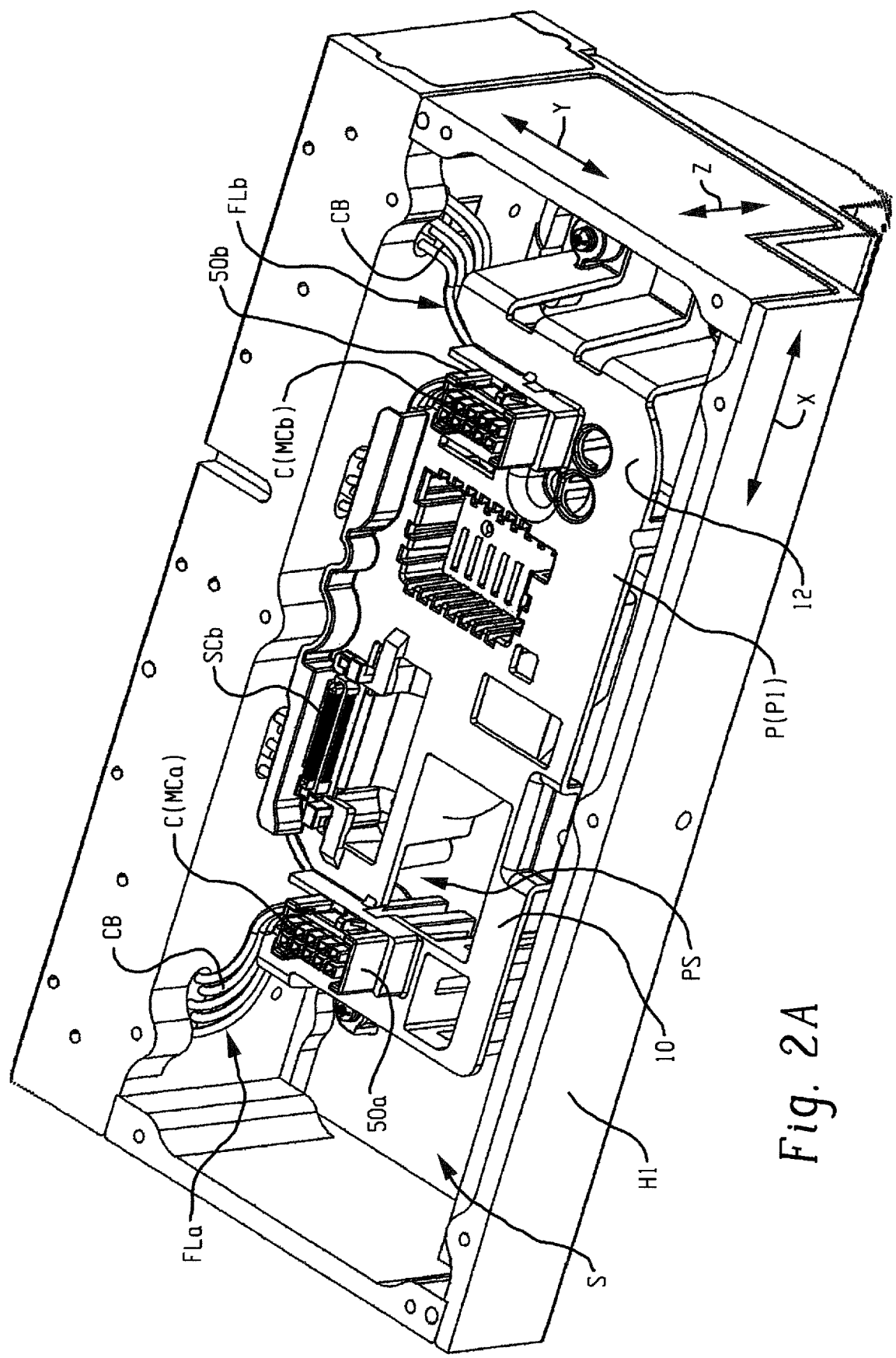
FIGS. 2A and 2B respectively show the first and second housing assemblies of FIGS. 1B and 1C with a second (upper) housing portion removed from the first (lower) housing portion to reveal a connector alignment and retention panel provided in accordance with a first embodiment (FIG. 2A) and a second embodiment (FIG. 2B) of the present development.
Figure 2B:
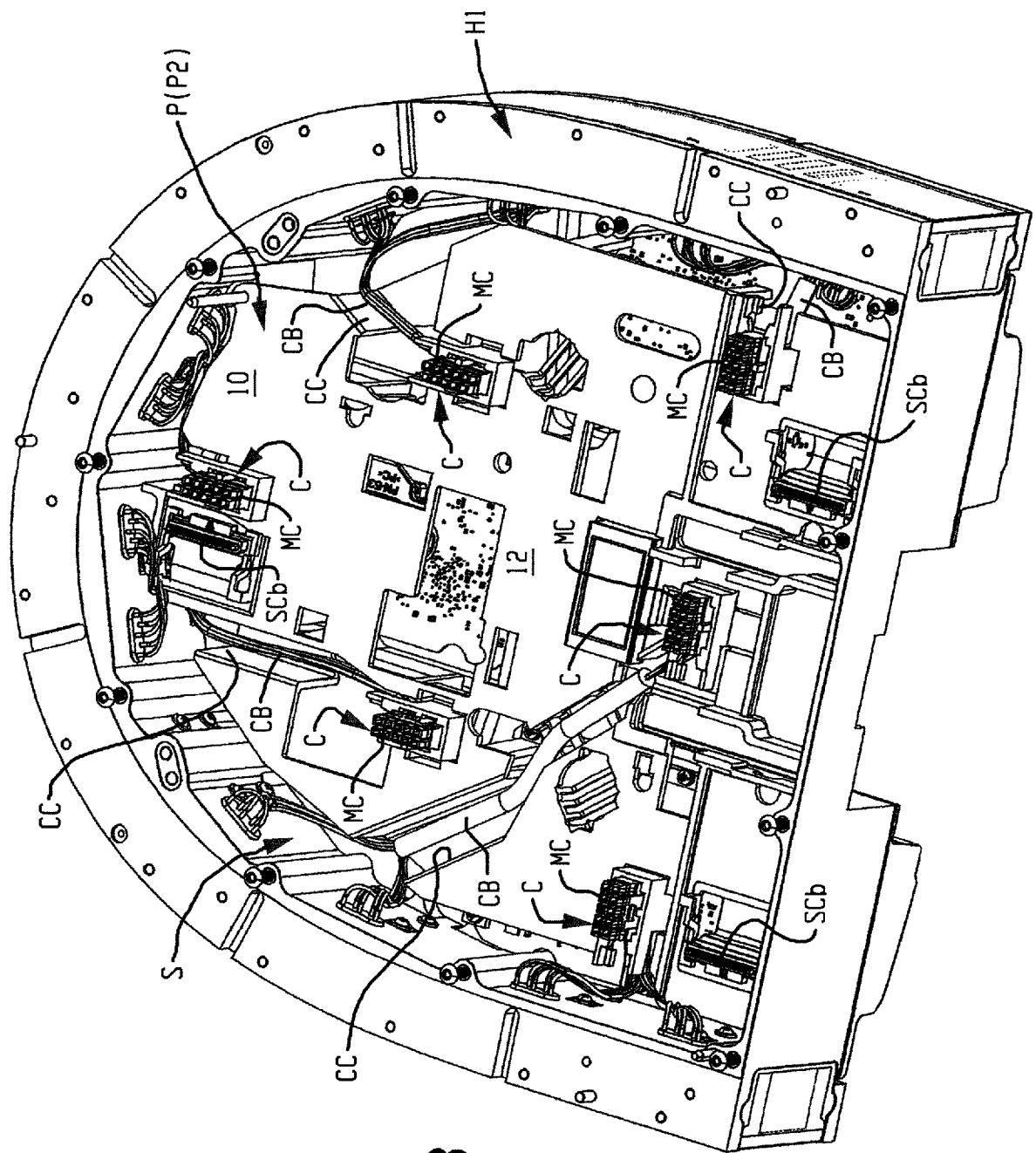

FIGS. 2A and 2B respectively show the first and second housing assemblies HA,HB with their second (upper) housing portion H2 removed from the first (lower) housing portion H1 to reveal a connector alignment and retention panel P (P1 for the housing HA of FIG. 2A, P2 for the housing HB of FIG. 2B). The connector alignment and retention panel P (P1,P2) is fixedly secured to the first (lower) housing portion H1 and is operatively engaged with and retains one or more flying lead connectors C of the first housing portion H1 in a select position so that the panel P operatively locates and retains the flying lead connectors C in a select location and orientation with respect to the first housing portion H1 to which the panel P is connected. In particular, each connector C engaged with and retained by the panel P is operatively located in a select, predetermined position relative to the first housing portion H1 with respect to all of the X,Y,Z axes of a conventional three-dimensional axis coordinate system, wherein axis Z is parallel to a connection axis CX (FIG. 7) along which the connector C mates with a mating connector and the axes X and Y being coplanar with each other and arranged perpendicular with respect to each other and each also being perpendicular to the Z axis. The connectors C held by the panel P are operatively positioned to mate with corresponding connectors CMCa,CMCb (see FIG. 7) connected to and carried by the second (upper) housing portion H2 when the second (upper) housing portion H2 is connected to the first (lower) housing portion H1 when the first and second housing portions H1,H2 are aligned and connected to each other. This mating of the connectors C (MCa,MCb) held by the panel P with the corresponding connectors CMCa,CMCb carried by the second housing portion H2 occurs in a single step as part of the process of connecting the second housing portion H2 to the first housing portion H1 and does not require an assembler to mate the connectors MCa,CMCa and MCb,CMCb prior to connecting the second (upper) housing portion H2 to the first (lower) housing portion H1, i.e., the connectors MCa,CMCa and MCb,CMCb are mated in a single-step when the second (upper) housing portion H2 is moved axially along the Z axis in a connection direction CD toward and into mating abutment with the first (lower) housing portion H1.

Figure 3A:
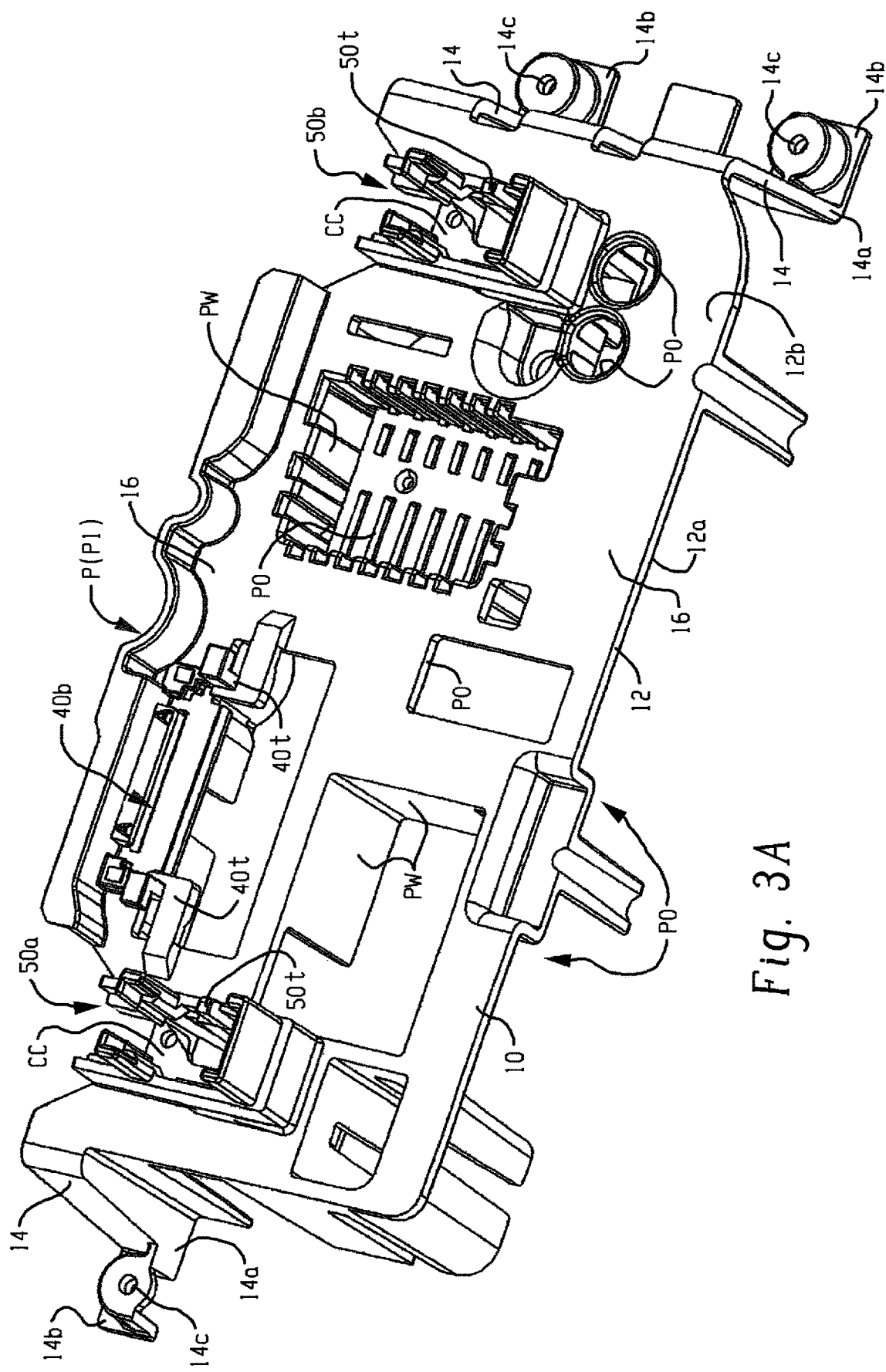
FIGS. 3A and 3B are respective isometric views of the first (straight) and second (curved) embodiments of a connector alignment and retention panel provided in accordance with the present development.
Figure 3B:
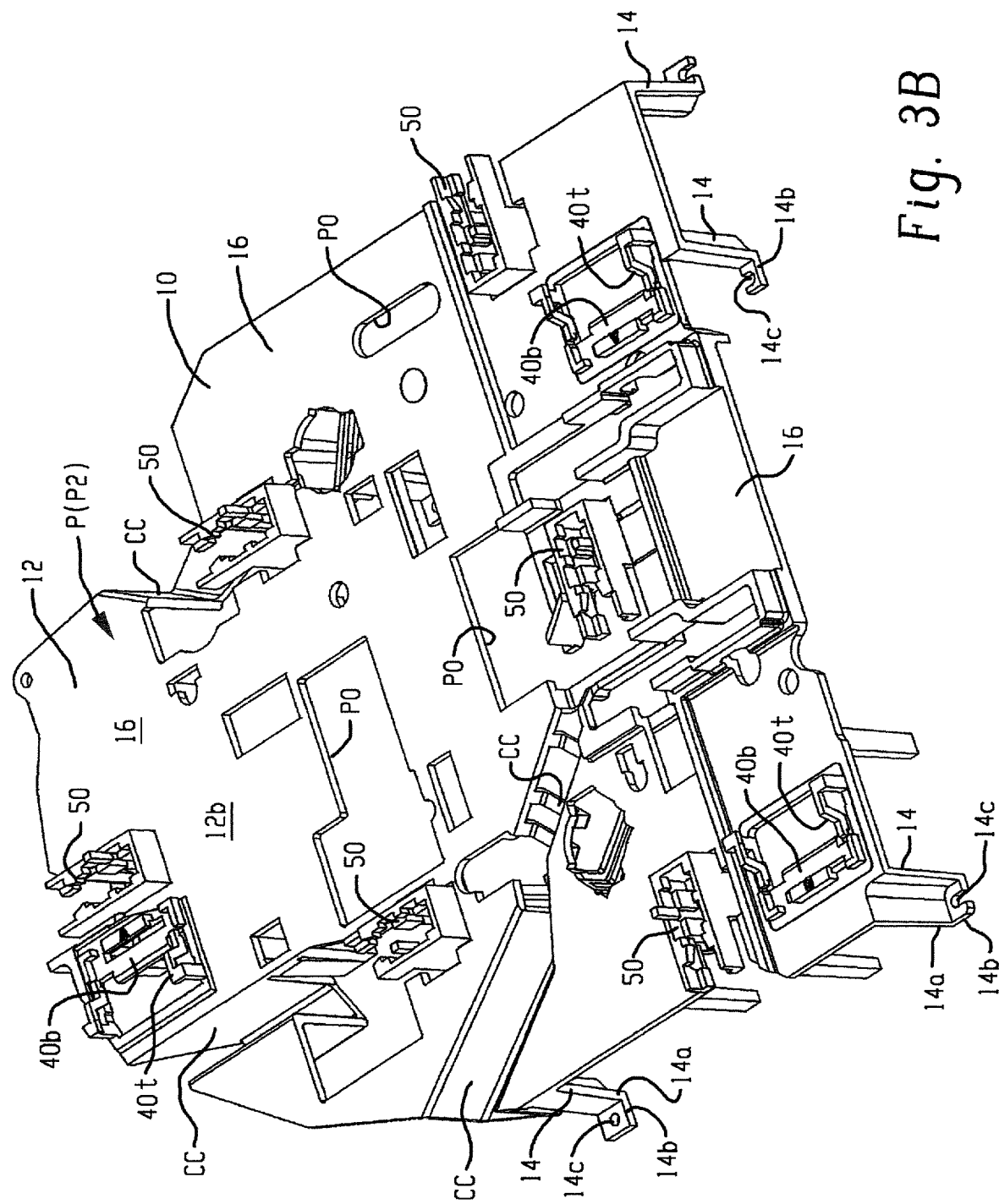

With continuing reference to FIGS. 2A and 2B, and also referring to FIGS. 3A and 3B, the panel P (P1,P2) comprises a one-piece polymeric body 10 defined by an injection molding process, an additive manufacturing process, extrusion process, thermoforming process, and/or other polymeric forming process. The panel P is electrically non-conductive and thus exhibits electrical insulation properties.

The panel body 10 comprises a connector support platform 12 and a plurality of support legs 14 that are connected to a peripheral edge of the connector support platform 12 and that extend transversely outwardly away from the connector support platform 12. At least one leg 14 includes, and preferably two or more of the legs 14 include, an outer end 14a that comprises a foot 14b that extends transversely outward from the outer end 14a of the leg 14 and that includes a mounting opening 14c such as an aperture, slot, or notch defined therein that is adapted to receive a screw or other fastener. The panel P is fixedly secured to one of the housing portions H1,H2 (the first housing portion H1 as shown in the present example) by fasteners F installed through the mounting opening 14c of each foot 14b (FIG. 7). Alternatively, the feet 14b can be inserted into notches or other receiving locations included in the first housing portion H1 by resilient flexing of the legs 14 such that the panel P is fixedly secured to the housing portion H1 without using fasteners.

Figure 4:
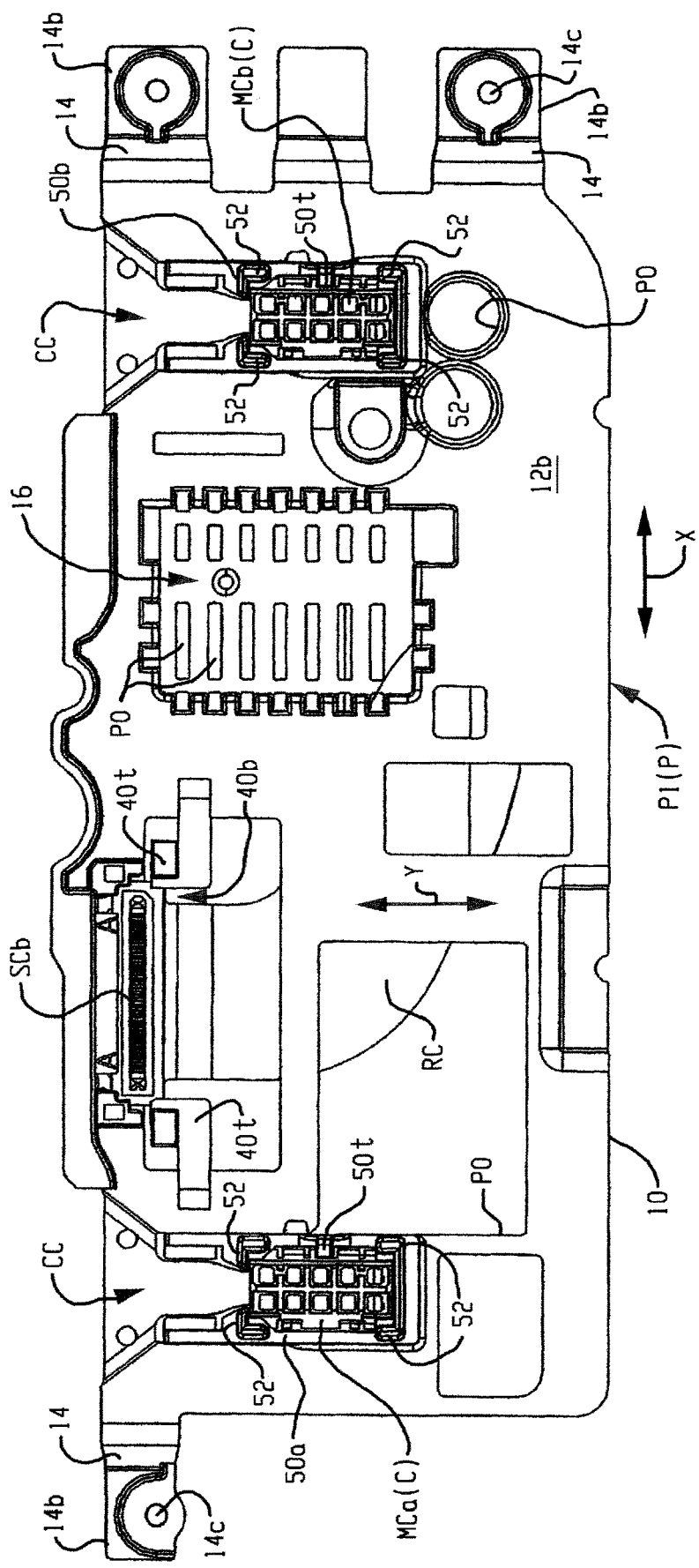
FIGS. 4, 5, and 6 are respective top, bottom, and isometric views of the first embodiment of the connector alignment and retention panel, including first and second motor connectors and first and second control signal connectors operatively secured thereto, with a ribbon cable extending between the first and second control signal connectors; and, FIG. 7 is a section view of the housing shown in FIG. 1A that illustrates operative use of the connector alignment and retention panel to connect one or more electronic elements connected to the first (upper) housing portion to one or more electronic elements connected to the second (lower) housing portion.
Figure 5:
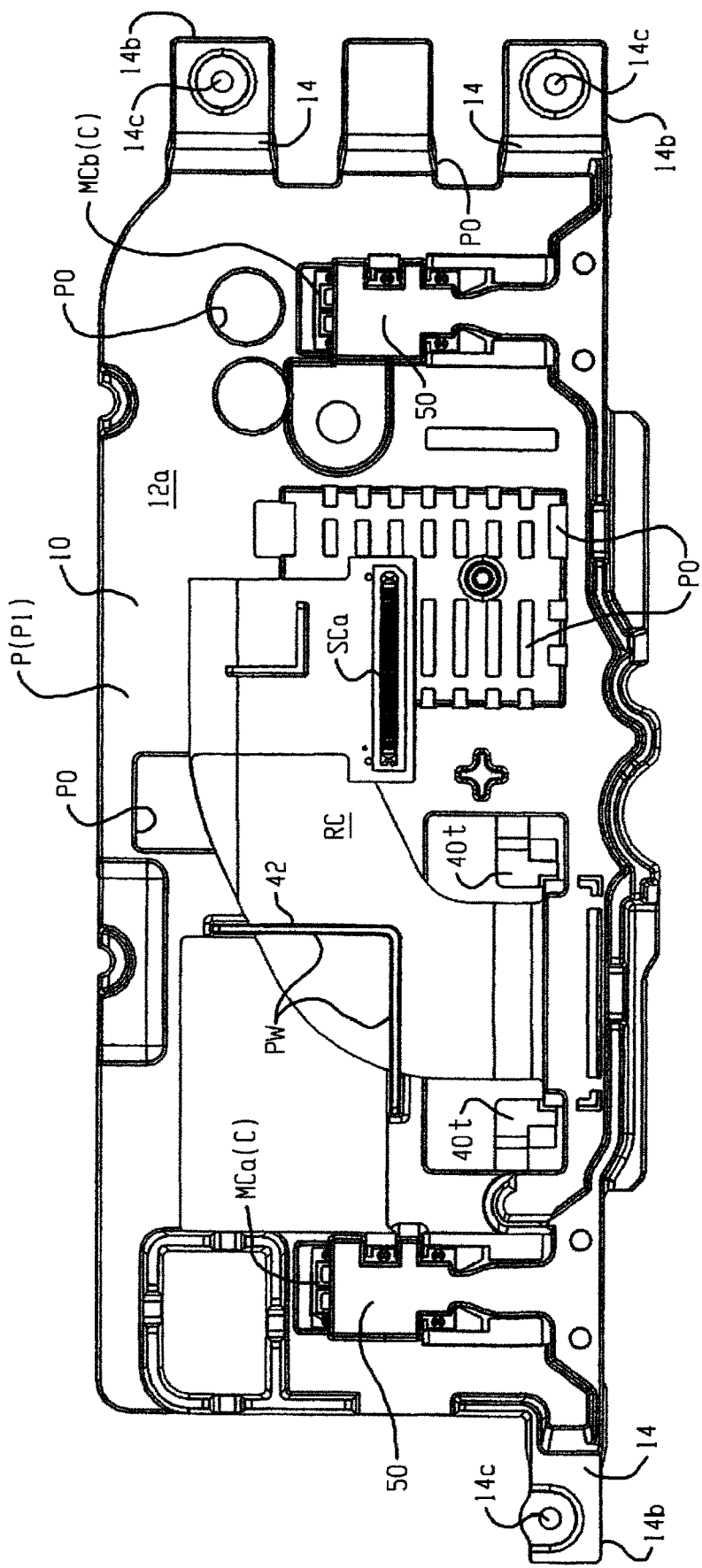
Figure 6:
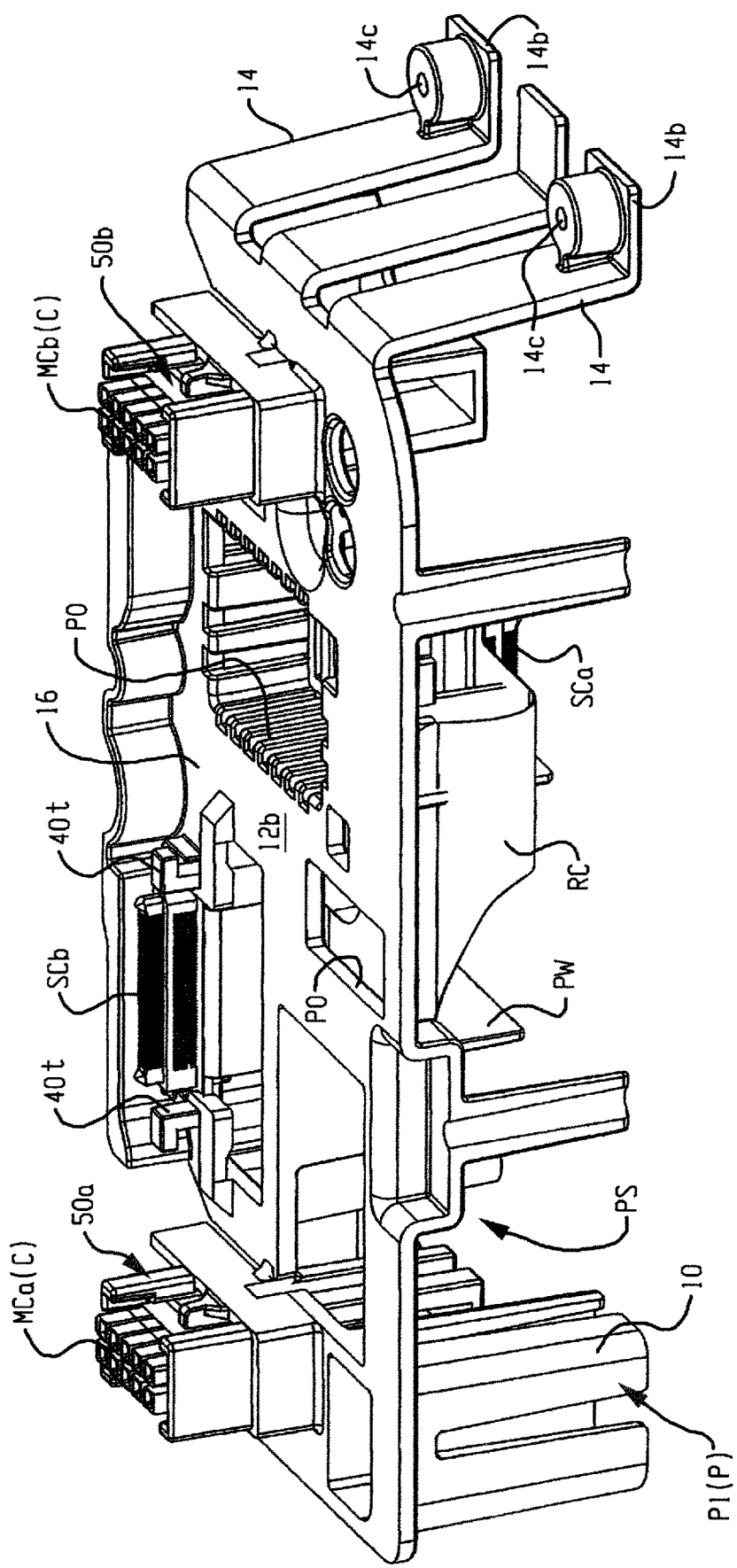

FIGS. 4-6 are respective top, bottom, and isometric views of the connector alignment and retention panel P(P1) of the present embodiment. FIG. 7 is a section view as taken at section line 7-7 of FIG. 1A that illustrates operative use of the panel P to connect one or more PCBs or other electronic elements E1 connected to the first (lower) housing portion H1 to one or more PCBs or other electronic elements E2 connected to the second (upper) housing portion H2. It can be seen in these views that that the connector support platform 12 includes opposite first (inner) and second (outer) surfaces 12a,12b. The first (inner) surface 12a is oriented inwardly toward the first housing portion H1 while the second (outer) surface 12b is oriented outwardly away from the first housing portion H1. The connector support platform 12 of the panel P is raised or vertically offset along the Z axis relative to the feet 14b to position to connectors C at a proper location along the Z axis for mating with the corresponding connectors MCa,MCb carried by the second (upper) housing portion H2. Accordingly, a panel space PS is defined under the first (inner) surface 12a between the inner surface 12a of the raised connector support platform 12 of the panel P and the first housing portion H1 to accommodate PCBs and other electronic devices E1 carried by the first housing portion H1. The panel P includes voids, openings, and other panel openings PO defined through the connector support platform 12 and also defined in the body 10 adjacent the legs 14 and around a peripheral edge of the connector support platform 12 so that the panel space PS is in fluid communication with the space S defined in the housing HA,HB so that air can flow freely into and out of the panel space PS to cool the PCBs and other electronic components carried by the first (lower) housing H1 and located in the panel space PS.

The panel P may include one or more partition walls PW that are connected to and that extend transversely outward from the inner and/or outer surfaces 12*a*,12*b* of the connector support platform 12 and that each provide or define an air baffle to block air flow, direct or deflect air flow, and/or route air flow in a desired direction and with a desired air flow velocity relative to the panel P. One or more of such partition walls PW can also be used to physically isolate, protect and/or electrically insulate/isolate or shield one or more electronic components E1 in the panel space PS and/or supported on the connector support platform 12 from other such electrical components. The connector support platform 12 of the panel P also includes or defines one or more component mounting locations 16 (FIGS. 3A & 3B) such as recesses or flat surfaces that each provide a mounting location for any desired electrical component such as a fan, a switch, an indicator LED, a heat sink, or any other desired component.

The panel P can include first and second high frequency signal connectors SCa,SCb connected thereto. The first and second signal connectors SCa,SCb are operably electrically interconnected by a cable such as the illustrated ribbon cable RC. The second (outer) surface 12*b* of the connector support platform 12 includes a second signal connector mounting locations 40*b* (see also FIGS. 3A and 3B). The second signal connector mounting location 40*b* is dimensioned and conformed to closely receive and retain the second control signal connector SCb such as with a snap-fit, friction fit, or other mechanical engagement. In the illustrated embodiment, the second signal connector mounting location 40*b* includes one or more resilient tabs 40*t* (FIGS. 3A and 3B) that retain the respective signal connector SCb in an operative position on the panel P with a snap fit. Preferably, the signal connector mounting location 40*b* is dimensioned to retain the signal connector SCb while also allowing limited movement of the connector SCb relative to the panel P along both the X and Y axes which are oriented transverse relative to the Z axis along which the connector SCb mates with a corresponding connector. This limited movement of the connector SCb relative to the panel P along both the X and Y axes allows the second signal connector SCb to move as required during the process of mating with a corresponding signal connector to accommodate or adapt to any misalignment between the connector SCb and the corresponding mating connector. The first high frequency signal connector SCa can be secured to the first side 12*a* of the connector support platform 12 in the same manner that the second signal connector 14*b* is secured to the second side 14*b* of the platform 12 but, as shown herein, the first signal connector SCa is not directly fixedly secured to the panel P. Instead, the first signal connector SCa is indirectly connected to the platform 12 of the panel P by way of its connection to the second signal connector 40*b* via cable RC. Thus, the first signal connector SCa is indirectly connected to the panel P via cable RC and is movable relative to the panel P.

As shown herein, the first and second control signal connectors SCa,SCb are high frequency signal connectors operatively electrically connected to each other by a cable such as the illustrated ribbon cable RC that extends through the panel space PS between the first and second signal connectors SCa,SCb to electrically interconnect the control signal connectors SCa,SCb. The panel P includes one or more slots or passages 42 for receiving and retaining the ribbon cable RC as it extends between and operatively interconnects the first and second signal connectors SCa, SCb.

The outer surface 12*b* of the connector support platform 12 further includes at least one and preferably two or more motor (or other) connector mounting locations 50*a*,50*b* (generally 50). Each motor connector mounting location 50*a*,50*b* is dimensioned and conformed to closely receive and retain a motor (or other) connector MC (MCa,MCb) such as the illustrated 10 pin motor plugs with a snap-fit, friction fit, or other engagement. In the illustrated example, the motor connector mounting locations 50*a*,50*b* thus each include one or more resilient tabs 50*t* that retain the respective motor connector MCa,MCb with a snap fit. Preferably, the motor connector mounting locations 50*a*,50*b* are dimensioned to retain the respective connectors MCa,MCb while also allowing limited movement of the connector MCa,MCb along both the X and Y axes which are oriented transverse relative to the Z axis along which the connector MC mates with a corresponding connector. This limited movement of the connectors MCa,MCb along both the X and Y axes allows the connectors MCa,MCb to "float" or move as required during the process of mating with a corresponding connector CMCa,CMCb to accommodate or adapt to any misalignment between the connector MC and the mating connector CMCa,CMCb.

As shown in the present embodiment, each connector mounting location 50 includes four corner regions 52*a*,52*b*, 52*c*,52*d* that extending perpendicularly outward from the upper surface 12*b* of the platform 12 to define a rectangular connector receiving region that receives and retains the connector MCa,MCb while allowing for limited movement of the connector MCa,MCb in the connector receiving region along the X and Y axes (the corner regions 52 can be separate from each other and provided as post structures or the corner regions can be interconnected to define a wall structure between themselves, both of which arrangements are shown in FIG. 4).

As best seen in FIGS. 2A, 2B, and 7, each panel P (P1,P2) includes one or more cable routing channels CC in communication with the connector mounting locations 50*a*,50*b* that receive and retain the cables or wires CB connected to the motor connectors MC. These cable routing channels CC each provide a groove, channel, or other recessed location that receives the connector cables CB to provide space for the cables CB, to protect the cables CB prevent contact between the cables CB and adjacent components, and locate the cables CB in their optimum positions to allow the second (upper) housing H2 to be connected to the first (lower) housing H1 without interference between one or more of the cables CB and the second (upper) housing H2. These cable routing channels CC ensure that the cables CB are always positioned as desired for optimum assembly of the housings HA,HB and to protect the cables CB from wear over time during use due to repeated shocks and vibrations.

The section view of FIG. 7 illustrates operative use of a panel P to connect a first group of one or more PCBs or other electronic elements E1 carried by the first (lower) housing portion H1 to a second group of one or more PCBs or other electronic elements E2 carried by the second (upper) housing portion H2. FIG. 7 shows the straight panel P1, but those of ordinary skill in the art will recognize that the curved panel P2 operates in a corresponding manner. In FIG. 7, it can be seen that the panel P is fixedly secured to the first (lower) housing H1 by a plurality of screws or other fasteners F respectively installed through the mounting opening 14c of a corresponding plurality of feet 14b and engaged with the housing H1. As such, the open panel space PS is defined between the inner surface 12a of the platform 12 of the panel and the housing H1. At least some of the first group of electronic elements E1 carried by the first (lower) housing portion H1 are located in the panel space PS.

As noted above, the first and second signal connectors SCa,SCb are connected to the panel P and are interconnected by a ribbon cable RC (the ribbon cable RC is omitted from FIG. 7 but is shown in FIGS. 4-6). The panel P positions the first and second signal connectors SCa,SCb in their respective required positions to mate respectively with corresponding signal connectors CSCa,CSCb that are part of the electronic elements E1,E2 carried by the first and second housings H1,H2 when the first and second housings H1,H2 are connected together during assembly. As such, it can be seen that the first signal connector SCa located in the panel space PS is operatively mated with a first corresponding signal connector CSCa carried by a PCB in the first (lower) housing H1 as part of the first group of electronic elements E1, and the second signal connector SCb located on the outer side 12b of the connector support platform 12 of the panel P is operatively mated with a second corresponding signal connector CSCb carried by a PCB in the second (upper) housing H2 as part of the second group E2 of electronic elements. This results in the first and second corresponding signal connectors CSCa,CSCb of the first and second housings H1,H2 being operatively electrically connected to each other by way of the ribbon cable RC and the signal connectors SCa,SCb located on the opposite ends of the ribbon cable RC (the cable RC need not be a ribbon cable and can be any other electrical signal cable).

Similarly, the first and second motor connectors MCa, MCb are operatively connected to the panel P via the first and second connector mounting locations 50 such that the first and second connectors MCa,MCb are operatively positioned to mate respectively with the corresponding connectors CMCa,CMCb carried by the second (upper) housing H2 as part of the second group of electronic elements E2. Those of ordinary skill in the art will recognize that the connectors MCa,MCb are positioned by the panel P such that they are properly operatively positioned to mate with their respective corresponding connectors CMCa,CMCb along their connection axis CX when the second (upper) housing H2 is mated with the first (lower) housing H1 during assembly of the overall housing HA,HB. In the illustrated embodiment, the first and second connectors MCa,MCb are located at the distal ends of respective flying lead cable bundles FLa,FLb each comprising a plurality (bundle) of the wires CB that originate at respective plugs PG or other electronic elements E1 carried by the first (lower) housing H1. The flying lead cable bundles FLa,FLb are safely retained by the panel P in the cable routing channels CC of the panel P to prevent movement of and otherwise control the position of the cables CB relative to the panel P and housing H1 and to protect the cables CB from fretting or other damage.

It should be noted that during disassembly, the second (upper) housing H2 is separated from the first (lower) housing H1 by movement of the second (upper) housing H2 along the Z axis away from the first (lower) housing H1. Such movement of the second (upper) housing H2 away from the first (lower) housing H1 along the Z axis causes disconnection of the first and second connectors MCa,MCb secured to the panel P from their respective first and second corresponding connectors CMCa,CMCb carried by the second (upper) housing H2 and also causes disconnection of the second signal connector SCb secured to the panel P from its corresponding signal connector CSCb carried by the second (upper) housing H2.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. An electronics housing assembly comprising:
   a first housing portion;
   a second housing portion removably connected to the first housing portion to define an interior space that contains electronics components, wherein a first group of said electronics components is connected to said first housing portion and a second group of said electronics components is connected to said second housing portion;
   a connector alignment and retention panel connected to the first housing portion, said connector alignment and retention panel comprising a connector support platform including a first connector mounting location, said connector alignment and retention panel comprising a one-piece polymeric structure;
   a first electrical connector that is part of said first group of said electronics components, said first electrical connector operatively engaged with the first connector mounting location of said panel such that said first electrical connector is mounted on said panel and located in a select position relative to said first housing portion;
   a first corresponding electrical connector that is part of said second group of said electronics components, said first corresponding electrical connector operatively secured to said second housing portion and operatively engaged with said first electrical connector mounted on said panel;
   wherein said one-piece polymeric structure of said connector alignment and retention panel comprises said connector support platform and further comprises a plurality of support legs that are each connected to a peripheral edge of said connector support platform.

2. The electronics housing assembly as set forth in claim 1, wherein said plurality of support legs each extend transversely outward from said connector support platform and each include an outer end that is spaced from the connector support platform.

3. The electronics housing assembly as set forth in claim 2, wherein said outer end of at least some of said a plurality of said support legs includes a support foot comprising a mounting opening defined therein, wherein a fastener is installed in said mounting opening and engaged with the first housing portion to fixedly secure said connector alignment and retention panel to said first housing portion.

4. The electronics housing assembly as set forth in claim 3, wherein said connector support platform of said connector alignment and retention panel is offset relative to said feet of said connector alignment and retention panel such that a panel space is defined between said connector support platform and said first housing portion, wherein at least part of said first group of electronics components is located in said panel space.

5. The electronics housing assembly as set forth in claim 4, further comprising a first cable routing channel, wherein said first electrical connector is connected to a first flying lead cable bundle comprising multiple wires, wherein said first flying cable bundle is received and retained in said first cable routing channel.

6. The electronics housing assembly as set forth in claim 5, wherein said first electrical connector is movable relative to said panel along at least X and Y axes that are coplanar and perpendicular relative to each other, wherein both said X and Y axes are perpendicular to a Z axis that is parallel to a connection axis along which said first electrical connector mates with said first corresponding electrical connector.

7. The electronics housing assembly as set forth in claim 6, wherein said first connector mounting location comprises a resilient tab that is adapted to engage and retain said first electrical connector in said first connector mounting location with a snap fit that accommodates said movement of said first electrical connector relative to said panel along at least said X and Y axes.

8. The electronics housing assembly as set forth in claim 1, wherein said electronics housing assembly further comprises:
first and second control signal connectors, wherein said second control signal connector is secured to said connector alignment and retention panel;
a cable that extends between and interconnects said first and second control signal connectors;
wherein said first control signal connector is operably mated with a first corresponding control signal connector that forms part of said first group of electronics components of said first housing portion and said second control signal connector is operably mated with a second corresponding control signal connector that forms part of said second group of electronics components of said second housing portion.

9. The electronics housing assembly as set forth in claim 8, wherein said connector support platform of said connector alignment and retention panel further comprises a second connector mounting location, and wherein said electronics housing assembly further comprises:
a second electrical connector that is part of said first group of said electronics components, said second electrical connector operatively engaged with the second connector mounting location of said panel such that said second electrical connector is mounted on said panel and located in a select position relative to said first housing portion;
a second corresponding electrical connector that is part of said second group of said electronics components, said second corresponding electrical connector operatively secured to said second housing portion and operatively engaged with said second electrical connector mounted on said panel.

10. The electronics housing assembly as set forth in claim 9, wherein said connector support platform of said connector alignment and retention panel further comprises a plurality of component mounting locations for mounting electrical components on said panel.

11. The electronics housing assembly as set forth in claim 10, wherein said connector alignment and retention panel further comprises a plurality of airflow openings defined through said one-piece structure to allow flow of air into said panel space.

12. The electronics housing assembly as set forth in claim 11, wherein said one-piece structure of said connector alignment and retention panel further comprises a plurality of partition walls that deflect flow of air relative to said panel.

13. A connector alignment and retention panel for an electronics housing assembly, said panel comprising:
a one-piece polymeric body comprising a connector support platform and a plurality of legs that extend outwardly relative to said connector support platform, each of said legs comprising a foot located at an outer end spaced from said platform such that said platform is offset from each foot, wherein each foot defines a mounting opening for receiving a fastener;
at least one electrical connector mounting location located on said connector support platform;
a first cable routing channel defined by said one-piece polymeric body that is adapted to receive a flying lead wire bundle;
wherein said at least one electrical connector mounting location comprises a resilient tab that is adapted to engage and retain an associated electrical connector with a snap fit that accommodates movement of the associated connector in two dimensions relative to said connector support platform.

14. The connector alignment and retention panel as set forth in claim 13, further comprising:
a control signal connector mounting location defined on said body;
a first control signal connector secured to said control signal connector mounting location;
a cable connected to said first control signal connector and adapted for operably connecting said first control signal connector to an associated second control signal connector.

15. A modular, scalable linear motor track system comprising:
a system housing including a rail;
at least one mover movably connected to said rail and adapted to move bi-directionally along said rail;
wherein said system housing comprises a housing assembly comprising:
a first housing portion;
a second housing portion removably connected to the first housing portion to define an interior space that contains electronics components, wherein a first group of said electronics components is connected to said first housing portion and a second group of said electronics components is connected to said second housing portion;
a connector alignment and retention panel connected to the first housing portion, said connector alignment and retention panel comprising a connector support platform including a first connector mounting location;
a first electrical connector that is part of said first group of said electronics components, said first electrical connector operatively engaged with the first connector mounting location of said panel such that said first electrical connector is mounted on said panel and located in a select position relative to said first housing portion;
a first corresponding electrical connector that is part of said second group of said electronics components, said first corresponding electrical connector operatively secured to said second housing portion and operatively engaged with said first electrical connector mounted on said panel.

* * * * *